(12) United States Patent
Eo et al.

(10) Patent No.: US 9,447,847 B2
(45) Date of Patent: Sep. 20, 2016

(54) AUTOMATED MANUAL TRANSMISSION FOR VEHICLE

(71) Applicant: Hyundai Motor Company, Seoul (KR)

(72) Inventors: Soon Ki Eo, Yongin-si (KR); Chon Ok Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/294,838

(22) Filed: Jun. 3, 2014

(65) Prior Publication Data

US 2015/0148182 A1 May 28, 2015

(30) Foreign Application Priority Data

Nov. 25, 2013 (KR) .......................... 10-2013-0143603

(51) Int. Cl.
*F16H 3/00* (2006.01)
*F16H 3/093* (2006.01)

(52) U.S. Cl.
CPC ....... *F16H 3/006* (2013.01); *F16H 2003/0931* (2013.01); *F16H 2200/006* (2013.01)

(58) Field of Classification Search
None
See application file for complete search history.

(56) References Cited

U.S. PATENT DOCUMENTS 6,984,187 B2 * 1/2006 Biermann .................... 475/275

FOREIGN PATENT DOCUMENTS

| JP | 2004-210116 A | 7/2004 |
|----|---------------|--------|
| JP | 2009-250276 A | 10/2009 |
| JP | 2010-513107 A | 4/2010 |
| JP | 2010-216605 A | 9/2010 |
| KR | 101241167 B1 | 3/2013 |
| KR | 10-1294089 B1 | 8/2013 |

* cited by examiner

*Primary Examiner* — Erin D Bishop
(74) *Attorney, Agent, or Firm* — Morgan, Lewis & Bockius LLP

(57) ABSTRACT

An automated manual transmission includes an input shaft for receiving a rotational force from a power source, a first output shaft and a second output shaft arranged parallel to the input shaft and draw out power, a first planetary gear device and a second planetary gear device arranged on the input shaft, a plurality of driving gears arranged on the input shaft to receive power through the first planetary gear device or the second planetary gear device, a plurality of driven gears arranged on the first output shaft or the second output shaft so as to form different shift stages, respectively, by meshing with the plurality of driving gears, a first brake provided for converting a state of coupling one rotational element of the first planetary gear device, and a second brake provided for converting a state of coupling one rotational element of the second planetary gear device.

14 Claims, 4 Drawing Sheets

AUTOMATED MANUAL TRANSMISSION FOR VEHICLE

CROSS-REFERENCE TO RELATED APPLICATION

The present application claims priority of Korean Patent Application Number 10-2013-0143603 filed on Nov. 25, 2013, the entire contents of which application are incorporated herein for all purposes by this reference.

BACKGROUND OF INVENTION

1. Field of Invention

The present invention relates to an automated manual transmission for a vehicle, and more particularly, to a structure of an automated manual transmission.

2. Description of Related Art

Generally, gears are shifted automatically by an actuator of an automated manual transmission while a vehicle travels to provide convenience similar to an automated transmission and contribute to improving the fuel efficiency of a vehicle with a better power transmission efficiency than an automated transmission.

However, in the case of an automated manual transmission based on a synchro-mesh type of shifting mechanism, a power interruption necessarily occurs in a moment while gears are shifted automatically by an actuator, thereby deteriorating a shift feeling as if pulling back a vehicle due to torque decrease caused by the power interruption.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the problems of the related art. Various aspects of the present invention provide for an automated manual transmission, through which the torque decrease that is transmitted to a driving wheel when shifting the gears can be excluded maximally with a simple configuration while using a part of a conventional manual transmission mechanism in which power has to be cut off instantly and then connected, thereby preventing the deterioration of the shift feeling and forming a soft and stable shift feeling, and further being able to enhance the fuel efficiency, thus improve the merchantability of a vehicle.

Various aspects of the present invention provide for an automated manual transmission for a vehicle that may include: an input shaft for receiving a rotational force from a power source, a first output shaft and a second output shaft that are arranged parallel to the input shaft and draw out power, a first planetary gear device and a second planetary gear device that are arranged on the input shaft, a plurality of driving gears that are arranged on the input shaft to receive power through the first planetary gear device and the second planetary gear device, a plurality of driven gears that are arranged on the first output shaft or the second output shaft so as to form different shift stages, by meshing with the plurality of driving gears, a first brake provided for converting a state of coupling or fixation one rotational element of the first planetary gear device, and a second brake provided for converting a state of coupling or fixation one rotational element of the second planetary gear device.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Figure 1:
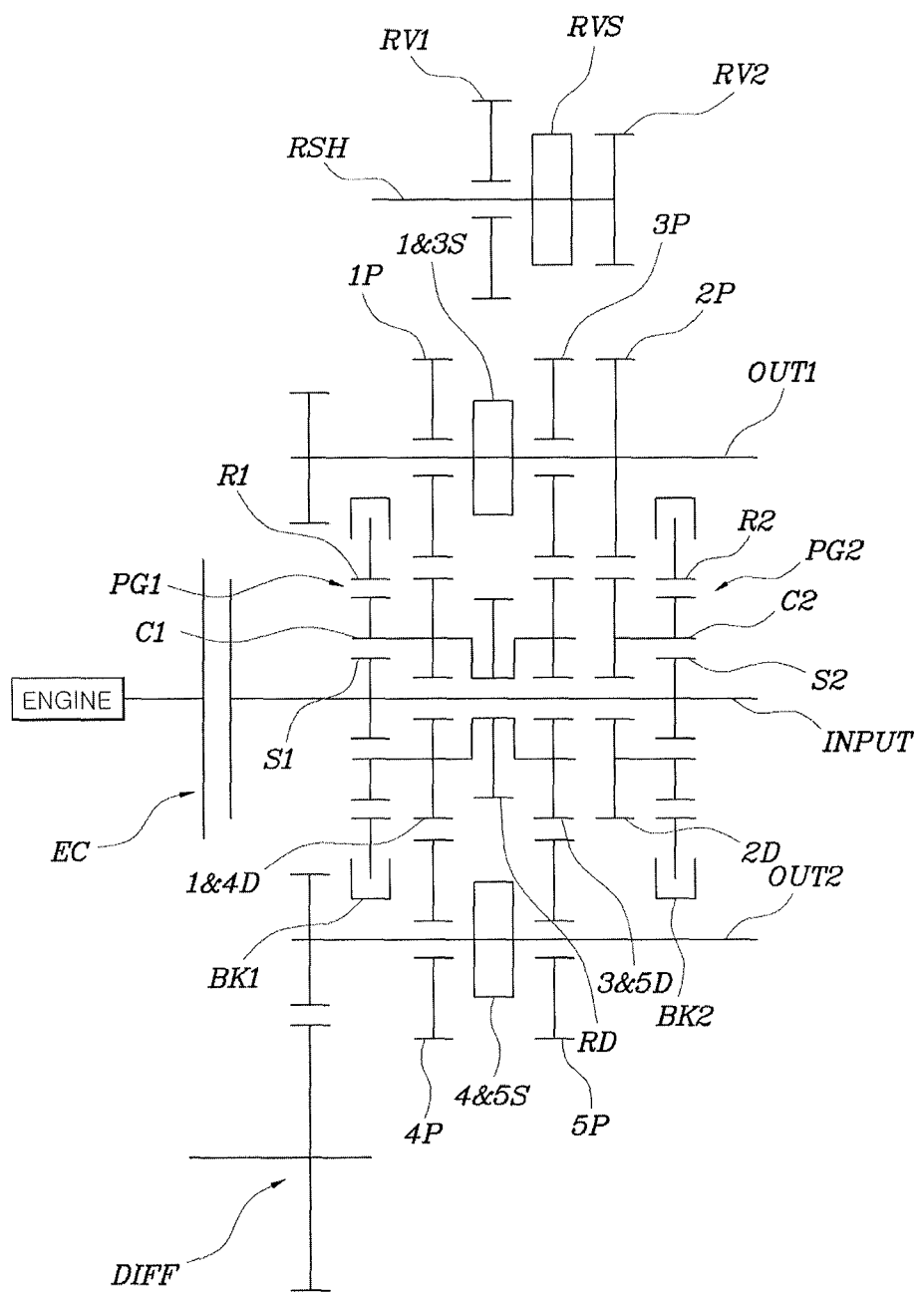
FIG. 1 is a view illustrating a first exemplary automated manual transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an automated manual transmission for a vehicle according to the present invention includes: an input shaft INPUT for receiving a rotational force from a power source; a first output shaft OUT1 and a second output shaft OUT2 that are arranged parallel or substantially parallel to the input shaft and draw out power; a first planetary gear device PG1 and a second planetary gear device PG2 that are arranged on the input shaft; a plurality of driving gears that are arranged on the input shaft to receive power through the first planetary gear device PG1 and the second planetary gear device PG2; a plurality of driven gears that are arranged on the first output shaft OUT1 or the second output shaft OUT2 so as to form different shift stages, by meshing with the plurality of driving gears; a first brake BK1 provided for converting a state of coupling one rotational element of the first planetary gear device PG1; and a second brake BK2 provided for converting a state of coupling a state of coupling one rotational element of the second planetary gear device PG2.

The input shaft INPUT is provided to receive power from an engine through an engine clutch EC and the rotational force provided to the input shaft INPUT is transmitted to the plurality of driving gears through the first planetary gear device PG1 and the second planetary gear device PG2 and then to be shifted while being transmitted to the driven gears that are meshed with the plurality of driving gears, and be drawn to a differential DIFF through the first output shaft OUT1 and the second output shaft OUT2.

The first planetary gear device PG1 is arranged such that a first sun gear S1 is coupled integrally to the input shaft INPUT, a first carrier C1 is connected to the driving gears, and a first ring gear R1 is coupled to the first brake BK1. Additionally or optionally, the second planetary gear device PG2 is arranged such that a second sun gear S2 is coupled integrally to the input shaft INPUT, a second carrier C2 is connected to the driving gears, and a second ring gear R2 is coupled to the second brake BK2.

Here, two driving gears, which implements two shift stages between which one shift stage is interposed among a series of shift stages implemented by the meshing of the driving gears and the driven gears, are coupled integrally to the first carrier C1 and the driving gear that forms a shift stage between the shift stages formed by the driving gears coupled to the first carrier C1 is coupled integrally to the second carrier C2.

For reference, the configurations as described above are common to the first to fourth embodiments as shown in FIGS. 1 to 4.

In the first embodiment as shown in FIG. 1, a driving gear for implementing a first shift stage and a driving gear for implementing a third shift stage are coupled integrally to the first carried C1, and a driving gear for implementing a second shift stage is coupled integrally to the second carrier C2.

Further, a first stage driven gear 1P to implement the first shift stage by meshing with the driving gear for implementing the first shift stage, a second stage driven gear 2P to implement the second shift stage by meshing with the driving gear for implementing the second shift stage, and a third stage driven gear 3P to implement the third shift stage by meshing with the driving gear for implementing the third shift stage are provided on the first output shaft OUT1.

Meanwhile, a fourth stage driven gear 4P to implement a fourth shift stage by meshing with the driving gear for implementing the first shift stage and a fifth stage driven gear 5P to implement a fifth shift stage by meshing with the driving gear for implementing the third shift stage are provided on the second output shaft OUT2.

That is, two output shafts of the first output shaft OUT1 and the second output shaft OUT 2 are provided and two different driven gears that are provided on the first output shaft OUT1 and the second output shaft OUT2 and meshed commonly with one driving gear are provided on the input shaft INPUT to form two shift stages using one driving gear and two driven gears, thereby increasing the number of the shift stage while shortening a whole length of a transmission as possible.

Accordingly, the driving gear of the input shaft INPUT for implementing the first shift stage is meshed commonly with the first stage driven gear 1P and the fourth shift stage driven gear 4P wherein hereinafter it is referred to as "1&4 driving gear 1&4D", and the driving gear of the input shaft INPUT for implementing the third shift stage is meshed commonly with the third stage driven gear 3P and the fifth shift stage driven gear 5P wherein hereinafter it is referred to as "3&5 driving gear 3&5D."

Meanwhile, according to the present embodiment only the second stage driven gear 2P is meshed with the second stage driving gear 2D and thus five forward shift stages and one reverse shift stage may be implemented totally.

A 1&3 stage synchro-device 1&3S is provided on the first output shaft OUT1 so as to couple or decouple the first stage driven gear 1P or the third stage driven gear 3P to the first output shaft OUT1, and a 4&5 stage synchro-device 4&5S is provided on the second output shaft OUT2 so as to couple or decouple the fourth stage driven gear 4P or the fifth stage driven gear 5P to the second output shaft OUT2, and the second stage driven gear 2P is coupled to the first output shaft OUT1.

The first carrier C1 is provided with a reverse driving gear RD for implementing a reverse shift stage, a reverse idler shaft RSH arranged in parallel or substantially in parallel to the first output shaft OUT1, a first reverse gear RV1 arranged rotatably on the reverse idler shaft and meshed with the reverse driving gear RD, a reverse stage synchro-device RVS arranged on the reverse idler shaft RSH to couple or decouple the first reverse gear RV1 to the reverse idler shaft RSH, and a second reverse gear RV2 arranged integrally on the reverse idler shaft RSH and meshed with the second stage driven gear 2P.

Accordingly, the reverse stage is implemented by coupling the first reverse gear RV1 to the reverse idler shaft RSH through the reverse stage synchro-device RVS and the reverse stage synchro-device RVS is to be decoupled such that the first reverse gear RV1 is rotated freely from the reverse idler shaft RSH under the states of other forward shift stages.

According to the transmission as configured above, the engine is started while the engine clutch EC is decoupled, and when the engine clutch EC is coupled while the first stage driven gear 1P is coupled to the first output shaft OUT1 through the 1&3 stage synchro-device 1&3S and the first brake BK1 brakes the first ring gear R1, the rotational force from an engine transmitted to the input shaft INPUT is speed-reduced with a carrier of the first planetary gear device PG1 and then transmitted to the 1&4 stage driving gear 1&4D to be drawn to a differential DIFF through the first stage driven gear 1P and the first output shaft OUT1, thereby implementing the first stage shift stage.

In order to shift the gears to a second stage from the first stage as described above the first brake BK1 is decoupled while the second brake BK2 is decoupled with a slip control and thus the gears are shifted without a torque decrease during the shifting of gears, and the gears are shifted completely by decoupling the 1&3 stage synchro-device 1&3S to a neutral state.

After that, in order to shift the gears to a third stage the first brake BK1 is coupled with a slip control while decoupling the second brake BK2 with a slip control in a state that the third stage driven gear 3P is coupled to the first output shaft OUT1 through the 1&3 stage synchro-device 1&3S, thereby completing the shifting without the torque decrease during the shifting of gears.

Subsequently, in order to shift the gears to a fourth stage the 1&3 stage synchro-device 1&3S is decoupled to a neutral stage while the engine clutch EC is decoupled and the engine clutch EC is coupled again while the fourth stage driven gear 4P is coupled to the second output shaft OUT2 through the 4&5 stage synchro-device 4&5S wherein the shifting procedures are applied to the shifting of gears to a fifth stage.

That is, according to the transmission of the present embodiment when shifting to the first to third stages of a relative low stage, the first brake BK1 and the second brake BK2 are slip-controlled reversely to each other in order to shift gears while preventing the torque decrease during the shifting, and when shifting to the fourth stage and the fifth stage of a relative high stage, the procedures which are the same as in a conventional manual transmission are adopted.

It is considered that the shift feeling deterioration becomes serious during the shifting between the relative low stages due to the torque decrease, but the shift feeling deterioration is felt slightly during the shifting between the relative high stages when a vehicle travelling at a high speed.

Figure 2:
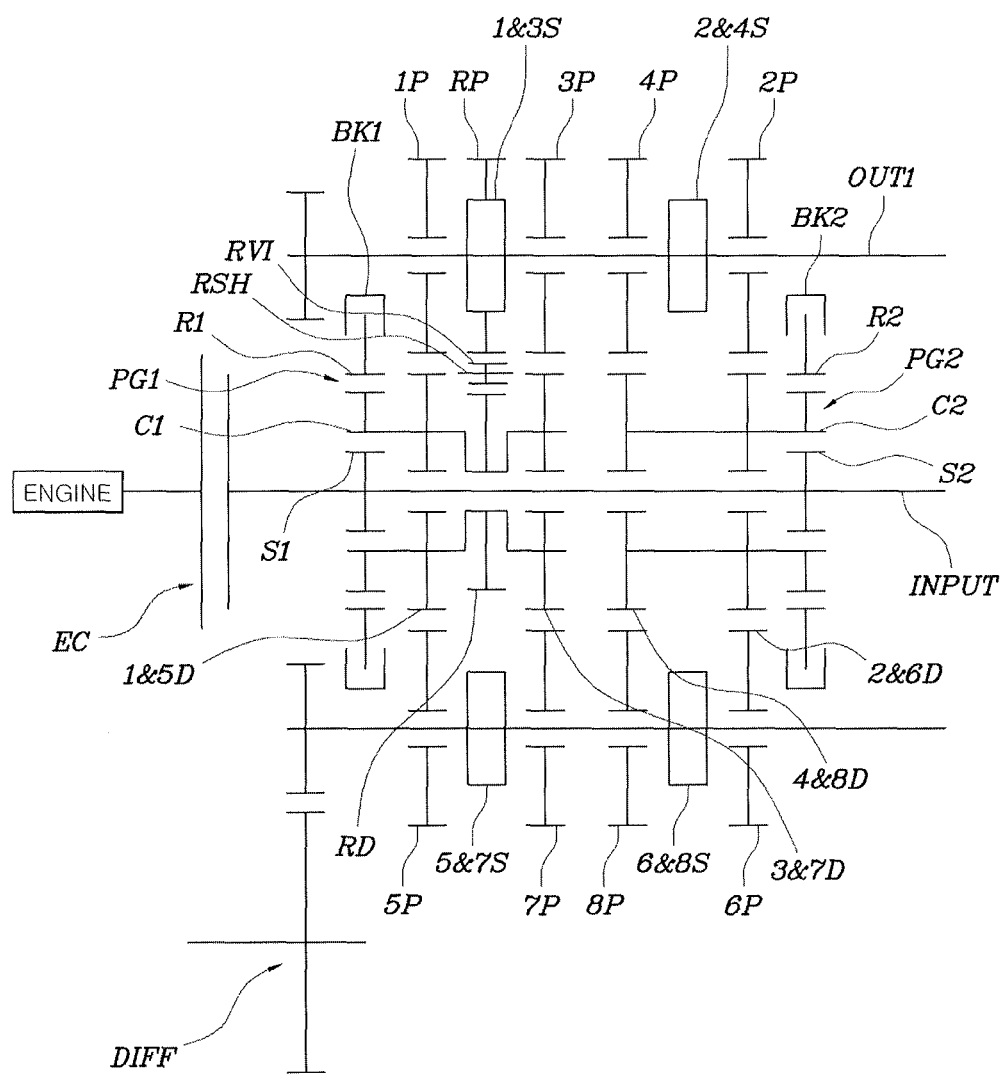
FIG. 2 is a view illustrating a second exemplary automated manual transmission for a vehicle according to the present invention.

FIG. 2 is a view showing a second embodiment of the present invention wherein other configurations are the same as or similar to the first embodiment as described above, except that other driving gears to implement shift stages adjacent to one of two shift stages that are implemented by two driving gears coupled to the first carrier C1 are further coupled to the second carrier C2, and thus the shift stages implemented by the driving gears coupled to the first carrier C1 and the shift stages implemented by the driving gears coupled to the second carrier C2 are formed alternatively.

That is, the driving gear which implements the first shift stage and the driving gear for implementing the third stage are coupled integrally to the first carrier C1 and the driving gear which implements the second shift stage and the driving gear for implementing the fourth stage are coupled integrally to the second carrier C2 wherein the driving gears to be coupled to the first carrier C1 and the driving gears to be coupled to the second carrier C2 implement the first to fourth shift stages that are alternative.

Accordingly, the fourth stage driven gear 4P to be meshed with the driving gear to implement the fourth shift stage is arranged further on the first output shaft OUT1, the second stage driven gear 2P is arranged rotatably on the first output shaft OUT1, and the 2&4 stage synchro-device 1&4S are further provided between the second stage driven gear 2P and the further stage driven gear 4P so as to couple or decouple them to the first output shaft OUT1.

Accordingly, the first stage driven gear 1P which implements the first shift stage by meshing with the driving gear for implementing the first shift stage, the second stage driven gear 2P which implements the second shift stage by meshing with the driving gear for implementing the second shift stage, the third stage driven gear 3P which implements the third shift stage by meshing with the driving gear for implementing the third shift stage and the fourth stage driven gear 4P which implements the fourth shift stage by meshing with the driving gear for implementing the fourth shift stage are provided on the first output shaft OUT1.

Meanwhile, the fifth stage driven gear 5P which implements the fifth shift stage by meshing with the driving gear for implementing the first shift stage, the sixth stage driven gear 6P which implements the sixth shift stage by meshing with the driving gear for implementing the second shift stage, the seventh stage driven gear 7P which implements the seventh shift stage by meshing with the driving gear for implementing the third shift stage and the eighth stage driven gear 8P which implements the eighth shift stage by meshing with the driving gear for implementing the fourth shift stage are provided on the second output shaft OUT2.

Accordingly, substantially the driving gear for implementing the first shift stage is the 1&5 stage driving gear 1&5D, the driving gear for implementing the second shift stage is the 2&6 stage driving gear 2&6D, the driving gear for implementing the third shift stage is the 3&7 stage driving gear 3&7D and the driving gear for implementing the fourth shift stage is the 4&8 stage driving gear 4&8D.

Further, the 1&3 stage synchro-device 1&3S provided on the first output shaft OUT1 so as to couple or decouple the first driven gear 1P or the third driven gear 3P to the first output shaft OUT1, the 2&4 stage synchro-device 2&4S provided on the first output shaft OUT1 so as to couple or decouple the second driven gear 2P or the fourth driven gear 4P to the first output shaft OUT1, the 5&7 stage synchro-device 5&7S provided on the second output shaft OUT2 so as to couple or decouple the fifth driven gear 5P or the seventh driven gear 7P to the second output shaft OUT2, and the 6&8 stage synchro-device 6&8S provided on the second output shaft OUT2 so as to couple or decouple the sixth driven gear 6P or the eighth driven gear 8P to the second output shaft OUT2 are arranged.

Meanwhile, in order to implement the reverse stage the reverse driving gear RD that is provided for implementing the reverse stage between the 1&5 stage driving gear 1&5D and the 3&7 stage driving gear 3&7 provided on the first carrier C1, the reverse driven gear RP that is formed integrally on an outer peripheral surface of a sleeve of the 1&3 stage synchro-device 1&3S for implementing the reverse stage, the reverse idler shaft RSH that is arranged in parallel to the input shaft INPUT and the first output shaft OUT1, and the reverse idler gear RV1 that is slid linearly on the reverse idler shaft RSH to be meshed with the reverse driving gear RD and the reverse driven gear RP simultaneously or released therefrom are arranged.

Accordingly, the reverse idler gear RV1 is slid on the reverse idler shaft RSH to be meshed with the reverse driving gear RD and the reverse driven gear RP simultaneously for implementing the reverse stage and in other states it is kept that the reverse idler gear RV1 is slid so as to be released from the reverse driving gear RD and the reverse driven gear RP.

According to a second embodiment of the present invention the shifting to the second stage from the first stage is implemented a little differently from the first embodiment wherein the first stage driven gear 1P is coupled to the first output shaft OUT1 through the 1&3 synchro-device 1&3S and the first stage is implemented while the first brake BK1 and the engine clutch EC are coupled, and in order to shift the second stage from the first stage the second stage driven gear 2P is coupled to the first output shaft OUT1 through the 2&4 stage synchro-device 2&4S and then the slip-control is performed to couple the second brake BK2 and to decouple the first brake BK1 to be shifted. After that, the 1&3 stage synchro-device 1&3S is released to a neutral state thereby to complete the shifting to the second stage.

The shifting procedures as described are applied to the remaining shift stages and thus detailed descriptions thereof are omitted.

Figure 3:
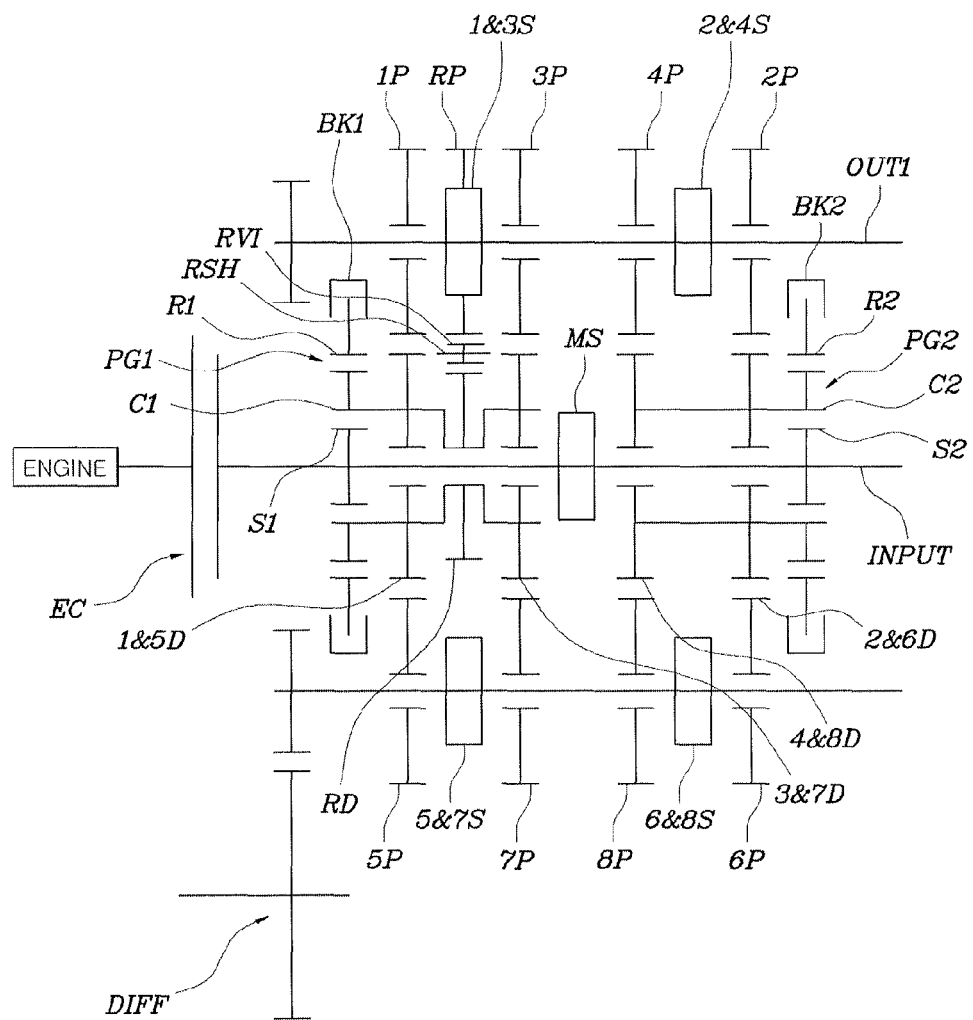
FIG. 3 is a view illustrating a third exemplary automated manual transmission for a vehicle according to the present invention.

FIG. 3 is a view showing a third embodiment of the present invention wherein most configurations thereof are identical to that of the second embodiment, except for the fact that a multi-stage synchro-device MS is further provided on the input shaft INPUT so as to couple or decouple the first carrier C1 of the first planetary gear device PG1 and the second carrier C2 of the second planetary gear device PG2 to the input shaft INPUT.

That is, when the first carrier C1 is coupled to the input shaft INPUT through the multi-synchro-device MS, all rotational elements of the first planetary gear device PG1 become a unit and the first planetary gear device PG1 is rotated at the same speed as the input shaft INPUT to output the rotation number that is different from the state where the first brake BK1 is coupled while the first carrier C1 is not coupled to the input shaft INPUT and the rotational number that is reduced from the speed of the input shaft INPUT is drawn out from the first carrier C1. Accordingly, the driving gears coupled to the first carrier C1 and the driven gears to be meshed therewith, respectively, implement substantially other shift stages, likewise the driving gears coupled to the second carrier C2 and the driven gears to be meshed therewith.

As such, according to the third embodiment of the present invention sixteen shift stages which are two times of eight shift stages can be implemented through a transmission.

Figure 4:
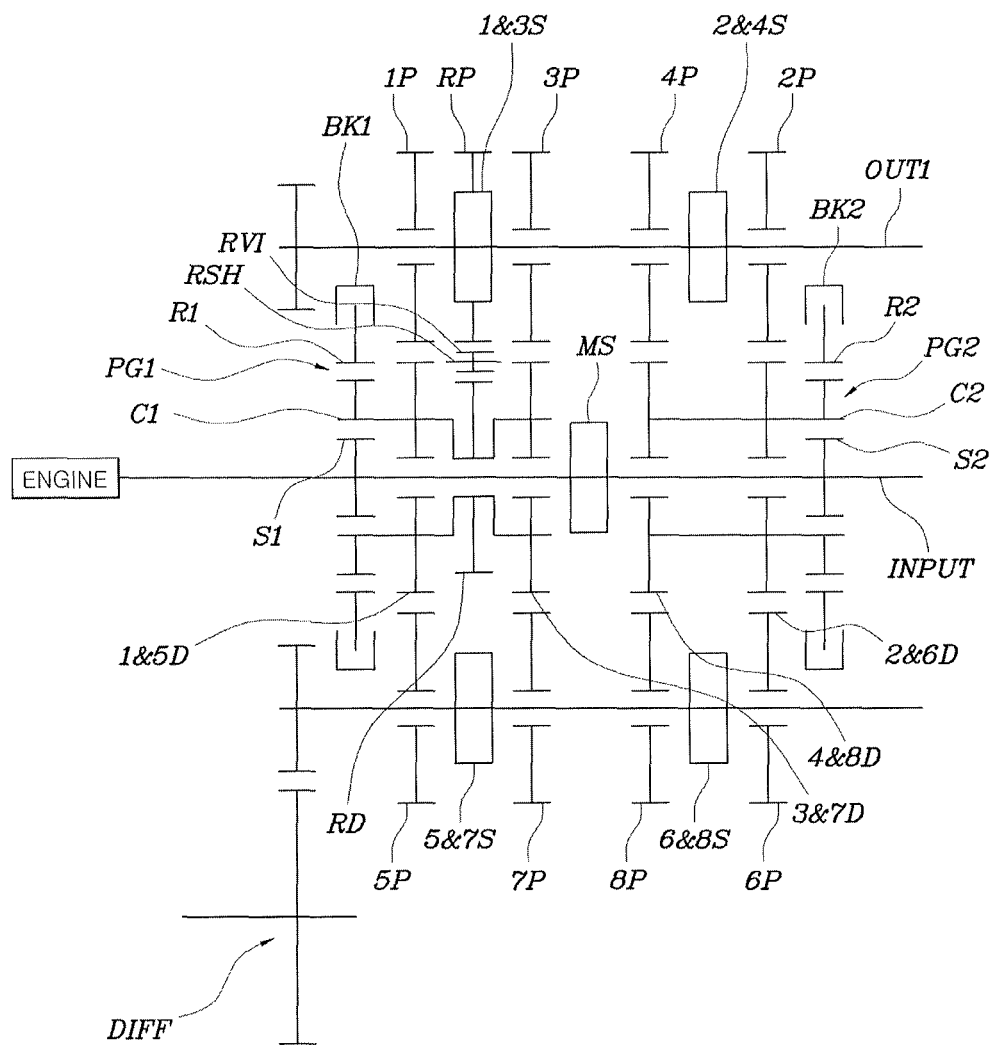
FIG. 4 is a view illustrating a further exemplary automated manual transmission for a vehicle according to the present invention.

FIG. 4 is a view showing a fourth embodiment of the present invention wherein the input shaft INPUT is coupled directly to an engine and the engine clutch EC is deleted as compared with the third embodiment.

That is, according to the fourth embodiment of the present invention the engine can be started while the first output shaft OUT1 and the synchro-device provided on the second output shaft OUT2 are all decoupled without the engine clutch EC, and even when shifting the gears the input shaft INPUT is coupled directly to the engine without the engine clutch EC such that the synchro-device of the corresponding target shift stage is coupled firstly before the first brake BK1 and the second brake BK2 are coupled and the synchro-device of the shift stage that is decoupled is decoupled after the corresponding brake is decoupled.

Of course, the transmission without the engine clutch EC as described above may be applied to the second embodiment of the present invention or the like.

According to the present invention, the torque decrease that is transmitted to a driving wheel when shifting the gears can be excluded maximally with a simple configuration while using a part of a conventional manual transmission mechanism in which power has to be cut off instantly and then connected, thereby preventing the deterioration of the shift feeling and forming a soft and stable shift feeling, and further increasing fuel efficiency to improve the merchantability of a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle comprising:
   an input shaft for receiving a rotational force from a power source;
   a first output shaft and a second output shaft that are arranged parallel to the input shaft and transfer power;
   a first planetary gear device having three rotational elements wherein the three rotational elements of the first planetary gear device include a first rotational element, a second rotational element, and a third rotational element and wherein the first rotational element of the first planetary gear device is directly connected to the input shaft; and
   a second planetary gear device having three rotational elements wherein the three rotational elements of the second planetary gear include a first rotational element, a second rotational element, and a third rotational element and the first rotational element of the second planetary gear device is directly connected to the input shaft;
   a plurality of driving gears that are rotatably arranged on the input shaft, wherein a predetermined number of the driving gears are directly connected to the second rotational element of the first planetary gear device and the rest of the driving gears are directly connected to the second rotational element of the second planetary gear device;
   a plurality of driven gears wherein a predetermined number of the driven gears are arranged on the first output shaft and the rest of the driven gears are arranged on the second output shaft so as to form different shift stages, respectively, by each of the driven gears meshing with a respective one of the driving gears;
   a first brake provided for braking the third rotational element of the first planetary gear device; and
   a second brake provided for braking the third rotational element of the second planetary gear device.

2. The automated manual transmission for the vehicle of claim 1, wherein:
   the first, second and third rotational elements of the first planetary gear device include a first sun gear, a first carrier, and a first ring gear; and
   the first planetary gear device is arranged such that the first sun gear is coupled integrally to the input shaft, the first carrier is connected to the predetermined number of the driving gears, and the first ring gear is coupled to the first brake;
   the first, second and third rotational elements of the second planetary gear device include a second sun gear, a second carrier, and a second ring gear; and
   the second planetary gear device is arranged such that the second sun gear is coupled integrally to the input shaft, the second carrier is connected to the rest of the driving gears, and the second ring gear is coupled to the second brake.

3. The automated manual transmission for the vehicle of claim 2, wherein:
   two driving gears out of the predetermined number of the driving gears implement two shift stages out of the different shift stages, wherein one shift stage out of the different shift stages is performed between the two shift stages, wherein the different shift stages are implemented by the meshing of each of the driving gears and the driven gears, and wherein the two driving gears are coupled integrally to the first carrier; and
   the rest of the driving gears include a driving gear, which implements the one shift stage performed between the two shift stages formed by the two driving gears coupled to the first carrier, and which is coupled integrally to the second carrier.

4. The automated manual transmission for the vehicle of claim 3, wherein a first driving gear of the two driving gears implements a first shift stage of the different shift stages and a second driving gear of the two driving gears implements a third shift stage of the different shift stages and the first driving gear and the second driving gear of the two driving gears are coupled integrally to the first carrier, wherein the one shift stage performed between the two shift stages is a second shift stage of the different shift stages and the driving gear for implementing the second shift stage of the different shift stages is coupled integrally to the second carrier.

5. The automated manual transmission for the vehicle of claim 4, wherein:

the predetermined number of the driven gears includes a first stage driven gear, a second stage driven gear, and a third stage driven gear, wherein the first stage driven gear which implements the first shift stage by meshing with the first driving gear for implementing the first shift stage, the second stage driven gear which implements the second shift stage by meshing with the driving gear for implementing the second shift stage, and the third stage driven gear which implements the third shift stage by meshing with the second driving gear for implementing the third shift stage are provided on the first output shaft; and the rest of the driven gears include a fourth stage driven gear and a fifth stage driven gear, wherein the fourth stage driven gear which implements a fourth shift stage of the different shift stages by meshing with the first driving gear for implementing the first shift stage and the fifth stage driven gear to implement a fifth shift stage of the different shift stages by meshing with the second driving gear for implementing the third shift stage are provided on the second output shaft.

6. The automated manual transmission for the vehicle of claim 5, further comprising:

a 1&3 stage synchro-device provided on the first output shaft so as to couple or decouple the first stage driven gear or the third stage driven gear with the first output shaft; and a 4&5 stage synchro-device provided on the second output shaft so as to couple or decouple the fourth stage driven gear or the fifth stage driven gear with the second output shaft, wherein the second stage driven gear is coupled with the first output shaft.

7. The automated manual transmission for the vehicle of claim 5, wherein:

the predetermined number of the driving gears includes a reverse driving gear, the first carrier is provided with the reverse driving gear for implementing a reverse shift stage of the different shift stages;

a reverse idler shaft is arranged parallel to the first output shaft;

a first reverse gear is arranged rotatably on the reverse idler shaft and meshed with the reverse driving gear;

a reverse stage synchro-device is arranged on the reverse idler shaft to couple or decouple the first reverse gear with the reverse idler shaft; and a second reverse gear is arranged integrally on the reverse idler shaft and meshed with the second stage driven gear.

8. The automated manual transmission for the vehicle of claim 2, wherein two shift stages of the different shift stages are implemented by two driving gears among the predetermined number of driving gears that are coupled to the first carrier, and driving gears among the rest of the driving gears implement shift stages among the different shift stages next to one of the two shift stages and are coupled with the second carrier, such that the two shift stages implemented by the two driving gears coupled to the first carrier and the shift stages implemented by the driving gears coupled to the second carrier are formed alternately.

9. The automated manual transmission for the vehicle of claim 8, wherein a first driving gear of the two driving gears, for implementing a first shift stage of the different shift stages and a second driving gear of the two driving gears, for implementing a third shift stage of the different shift stages are coupled integrally with the first carrier, and a third driving gear among the rest of the driving gears, for implementing a second shift stage of the different shift stages and a fourth driving gear among the rest of the driving gears, for implementing a fourth shift stage of the different shift stages are coupled integrally with the second carrier.

10. The automated manual transmission for the vehicle of claim 9, wherein:

the predetermined number of the driven gears includes a first stage driven gear, a second stage driven gear, a third stage driven gear, and a fourth stage driven gear;

the first stage driven gear which implements the first shift stage by meshing with the first driving gear for implementing the first shift stage, the second stage driven gear which implements the second shift stage by meshing with the third driving gear for implementing the second shift stage, the third stage driven gear which implements the third shift stage by meshing with the second driving gear for implementing the third shift stage and the fourth stage driven gear which implements the fourth shift stage by meshing with the fourth driving gear for implementing the fourth shift stage are provided on the first output shaft;

the rest of the driven gears includes a fifth stage driven gear, a sixth stage driven gear, a seventh stage driven gear, and an eighth stage driven gear, the fifth stage driven gear which implements a fifth shift stage of the different shift stages by meshing with the first driving gear for implementing the first shift stage, the sixth stage driven gear which implements a sixth shift stage of the different shift stages by meshing with the third driving gear for implementing the second shift stage, the seventh stage driven gear which implements a seventh shift stage of the different shift stages by meshing with the second driving gear for implementing the third shift stage and the eighth stage driven gear which implements an eighth shift stage of the different shift stages by meshing with the fourth driving gear for implementing the fourth shift stage are provided on the second output shaft.

11. The automated manual transmission for the vehicle of claim 10, further comprising:

a 1&3 stage synchro-device provided on the first output shaft so as to couple or decouple the first driven gear or the third driven gear with the first output shaft;

a 2&4 stage synchro-device provided on the first output shaft so as to couple or decouple the second driven gear or the fourth driven gear with the first output shaft;

a 5&7 stage synchro-device provided on the second output shaft so as to couple or decouple the fifth driven gear or the seventh driven gear with the second output shaft; and a 6&8 stage synchro-device provided on the second output shaft so as to couple or decouple the sixth driven gear or the eighth driven gear with the second output shaft.

12. The automated manual transmission for the vehicle of claim 11, wherein the predetermined number of the driving gears includes a reverse driving gear that is provided for implementing a reverse stage of the different shift stages between the driving gear for implementing the first shift stage and the driving gear for implementing the third shift stage provided on the first carrier; and wherein the automated manual transmission further includes:

a reverse driven gear that is formed integrally on an outer peripheral surface of a sleeve of the 1&3 stage synchro-device for implementing the reverse stage;

a reverse idler shaft that is arranged parallel to the input shaft and the first output shaft; and a reverse idler gear that is slid linearly on the reverse idler shaft to be meshed with the reverse driving gear and the reverse driven gear simultaneously or released therefrom.

13. The automated manual transmission for the vehicle of claim 11, wherein the input shaft is coupled directly to an engine.

14. The automated manual transmission for the vehicle of claim 1, further comprising a multi-stage synchro-device provided on the input shaft so as to couple or decouple the first carrier of the first planetary gear device or the second carrier of the second planetary gear device with the input shaft.

* * * * *